(12) United States Patent
Storey et al.

(10) Patent No.: US 10,460,293 B2
(45) Date of Patent: Oct. 29, 2019

(54) SYSTEM AND METHOD FOR IMPLEMENTING A GLOBAL PAYMENT ENGINE

(71) Applicant: JPMorgan Chase Bank, N.A., New York, NY (US)

(72) Inventors: Ian Storey, Southsea (GB); Ritesh R. Sonawala, Bournemouth (GB); Michael John Barber, Bournemouth (GB); Rob Barnes, Bournemouth (GB); Benedict William Hannibal Dixon, Ranmore Common (GB); Kirti Khushalani, Las Palmas de Gran Canaria (ES); Benjamin Kneebone, Bournemouth (GB); Satish Kumar, Bournemouth (GB); Stuart Perks, Sutton Coldfield (GB); Mark A. Jackson, Westerville, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 329 days.

(21) Appl. No.: 15/187,004

(22) Filed: Jun. 20, 2016

(65) Prior Publication Data
US 2017/0364877 A1 Dec. 21, 2017

(51) Int. Cl.
*G06Q 20/14* (2012.01)
*G06Q 30/04* (2012.01)
*G06Q 20/02* (2012.01)
*G06Q 20/40* (2012.01)

(52) U.S. Cl.
CPC ......... *G06Q 20/027* (2013.01); *G06Q 20/405* (2013.01); *G06Q 20/4016* (2013.01)

(58) Field of Classification Search
CPC .... G06Q 20/102; G06Q 20/14; G06Q 20/145; G06Q 30/04
USPC .......................................................... 705/40
See application file for complete search history.

(56) References Cited

U.S. PATENT DOCUMENTS

| | | | | | |
|---|---|---|---|---|---|
| 8,924,289 | B1 * | 12/2014 | Knight | ................... | G06Q 20/04 235/379 |
| 2014/0101034 | A1 * | 4/2014 | Tanner | ................... | G06Q 20/10 705/39 |
| 2015/0046319 | A1 * | 2/2015 | Thomas | ................ | G06Q 20/02 705/39 |

OTHER PUBLICATIONS

"Corporate Services: Chase Gears Up Global Payments System Series: 16", Steven Marjanovic, American Banker (pre-1997 Full text). New York, N.Y.: Sep. 11, 1995. vol. 160, Iss. 174; p. 41.*

(Continued)

*Primary Examiner* — Hai Tran
(74) *Attorney, Agent, or Firm* — Hunton Andrews Kurth LLP

(57) ABSTRACT

The invention relates to a method and system that implements a payment initialization input that receives an electronic payment; the payment initialization input generates a payment context with an execution plan; a payments topology comprising a stage router, coupled to the payment initialization input and further in communication with a transform-to-external component and de-duplication component; and the stage router routes the payment context in accordance with the execution plan to a plurality of stages, the plurality of stages comprising a validation stage, an enrichment stage, a controls stage and a clearing stage where after each stage, the payment context is routed back to the stage router before being routed to a subsequent stage.

20 Claims, 12 Drawing Sheets

(56) References Cited

OTHER PUBLICATIONS

USPTO, TC3600, EIC NPL Search Results for U.S. Appl. No. 15/187,004, pp. 1-30, dated Jun. 25, 2018.*

* cited by examiner

SYSTEM AND METHOD FOR IMPLEMENTING A GLOBAL PAYMENT ENGINE

FIELD OF THE INVENTION

The invention relates generally to a payment engine, and more particularly to a system and method that implements a global payment engine comprising a Stage Router that routes a payment context to stages based on an execution plan.

BACKGROUND OF THE INVENTION

Globalization in the banking industry is driving the need for a global inter-operative payments engine that enables global banks to compete more effectively. Automation and standardization are essential for effective management of domestic and worldwide regulatory requirements, and reliable liquidity and risk management.

Payment Engines may involve a single-payment operations platform that connects to multiple internal and external payment channels. Features include components to verify, sort, and clear payment transactions. Payment Engines provide high straight-through processing rates, batch processing, and real-time processing, as well as 24×7 reporting. Traditional payment engines can handle low-value, non-time-critical payments as well as high-value, time-critical payments.

Significant opportunities exist to consolidate platforms to build a true global payment engine to serve the future payments landscape within a financial institution.

These and other drawbacks currently exist.

SUMMARY OF THE INVENTION

According to one embodiment, the invention relates to a global payment engine comprising: a payment initialization input that receives an electronic payment; the payment initialization input generates a payment context with an execution plan; a payments topology comprising a stage router, coupled to the payment initialization input and further in communication with a transform-to-external component and de-duplication component; and the stage router routes the payment context in accordance with the execution plan to a plurality of stages, the plurality of stages comprising a validation stage, an enrichment stage, a controls stage and a clearing stage where after each stage, the payment context is routed back to the stage router before being routed to a subsequent stage.

The system may include a specially programmed computer system comprising one or more computer processors, mobile devices, electronic storage devices, and networks.

The invention also relates to computer implemented method for implementing a global payment engine that comprises the steps of: receiving, via a payment initialization input, an electronic payment; the payment initialization input generates a payment context with an execution plan; implementing a payments topology comprising a stage router, coupled to the payment initialization input and further in communication with a transform-to-external component and de-duplication component; and routing, via the stage router, the payment context in accordance with the execution plan to a plurality of stages, the plurality of stages comprising a validation stage, an enrichment stage, a controls stage and a clearing stage where after each stage, the payment context is routed back to the stage router before being routed to a subsequent stage.

The computer implemented system, method and medium described herein provide unique advantages to global payment entities, according to various embodiments of the invention. The innovative system and method provide a global payment solution that improves efficiency, reliability and speed in processing global payments. Specifically, the payment engine of an embodiment of the present invention provides resiliency, scalability, security, deployment and ease of developer on-boarding. Other advantages include customer loyalty and retention due to the increased satisfaction of customers. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

A embodiment of the present invention is directed to a payment engine may be built on an infrastructure implementing a number of common services such as prioritization, initialization and audit utilizing frameworks, such as common Java frameworks.

The innovative system and method may tolerate multiple failures from distinct components with minimal or no loss of service or payments. Moreover, this infrastructure is highly performant, processing approximately 1200 encrypted payments/sec across multiple shared physical hosts, with an individual payment taking approximately 100 ms in a current state. According to an embodiment of the present invention, deployment of the payment engine application may be achieved in a single secure access controlled command across the cluster in less than 1 m.

Figure 1:
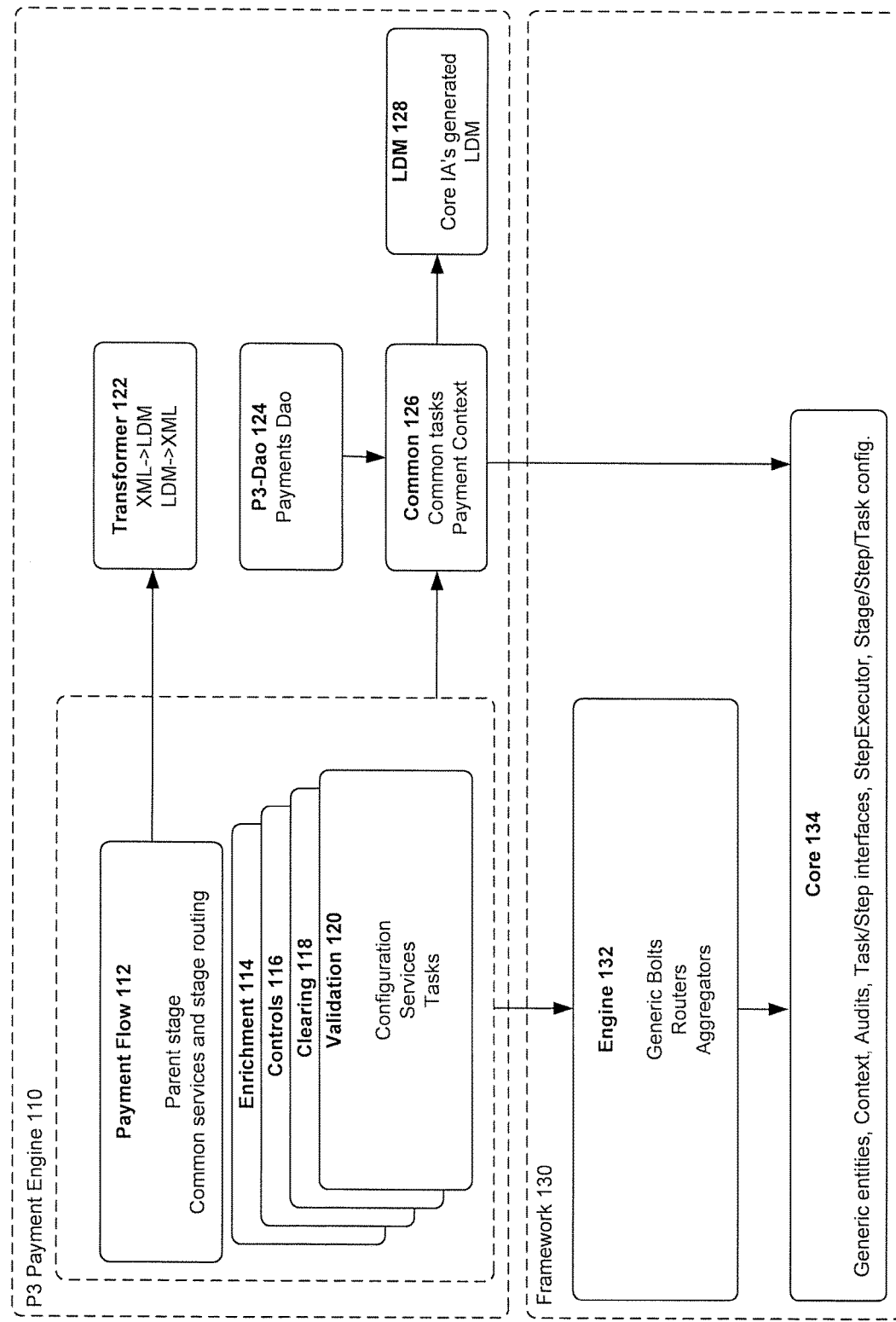
FIG. 1 is an exemplary illustration of a payment engine structure, according to an embodiment of the present invention.

FIG. 1 is an exemplary illustration of a payment engine structure, according to an embodiment of the present invention. The Payment Engine of an embodiment of the present invention provides an end-to-end payment flow that is directed to avoiding loss of a payment and further avoids duplicate payments. The Payment Engine of an embodiment of the present invention may include three main parent areas of functionality, including (1) framework, (2) Payment Processing Platform (P3) and (3) workflow.

A framework layer of an embodiment of the present invention provides platform agnostic classes and interfaces as well as integration with other interfaces and components. The framework of an embodiment of the present invention defines flows and common services.

P3 may represent a payment engine implementation containing service implementation and topology definitions. As shown in FIG. 1, P3 Payment Engine 110 may include a plurality of topologies, including Payment Flow 112; Enrichment 114, Controls 116, Clearing 118 and Validation 120. For example, Validation 120 may include configuration, services and tasks. In this example, Payment Flow 112 may communicate to Transformer 122. The topologies illustrated in FIG. 1 may communicate with Common 126, which receives input from P3-Dao 124, which represents a distributed OLTP database instance for payment details and status, and further communicate with Logical Data Model (LDM) 128. Framework 130 may include Engine 132 (that supports Routers and Aggregators) and Core 134, which may represent generic entities, context, audits, task/step interfaces, step executor, stage, step, task configurations, etc.

Figure 2:
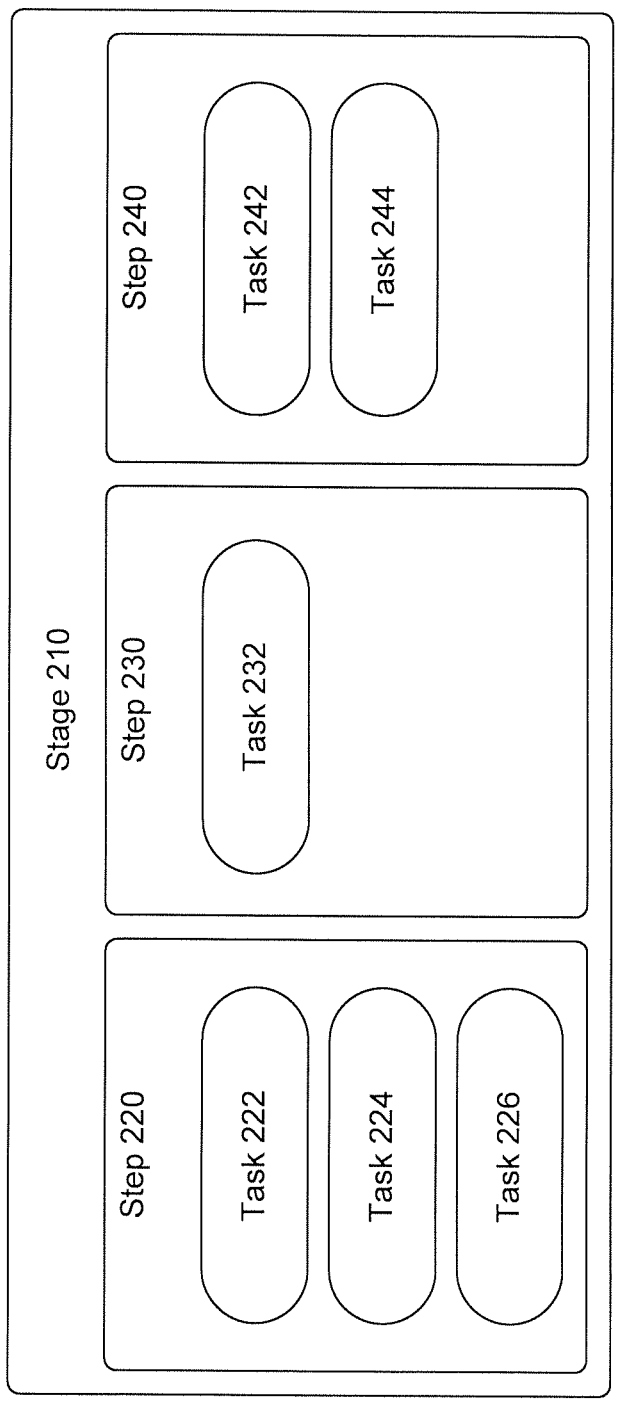
FIG. 2 is an illustration of stages, steps and tasks as applied to a payment engine, according to an embodiment of the present invention.

FIG. 2 is an illustration of stages, steps and tasks as applied to a payment engine, according to an embodiment of the present invention. The innovative system supports a framework independent collection of interfaces, services and patterns which may be composed in a predefined manner to produce a processing engine. Such a processing engine is not limited to payment processing and may be applied to various other applications, systems and services.

The framework may include stage and step abstractions. As shown in FIG. 2, a Stage 210 may represent a logical grouping of steps 220, 230, 240 which perform a related high level function. For example, a stage could be "validation," with this stage performing several distinct validation steps. A Step may represent a logical grouping of one or more tasks which work together to perform the same function. For example, Step 220 may include Tasks 222, 224, 226. Step 230 may include Task 232. And, Step 240 may include Tasks 242, 244. Steps and Stages may be as simple or complex as defined by the associated Tasks. Steps may also encapsulate a transactional unit of work and therefore a transaction may span multiple tasks. Apart from tasks, no user code may be encapsulated within a step. In this example, the framework may use a step to manage auditing and transactions for tasks within a step. A Task may represent a unit of business logic as implemented by a developer. Framework agnostic, a task may invoke a service and perform an action. An Execution Plan may represent a plan of stages, steps and/or tasks to be executed for a given message, driven by a runtime executed ruleset. A task may operate on a "Context," providing a wrapper around the implementation specific message data and execution plan.

The payment engine of an embodiment of the present invention may include additional key service concepts and interfaces, such as initialization, de-duplication, stage router, step router and reference data. For example, Initialization may refer to initializing a context with an execution plan. De-duplication may refer to accurate duplicate filtering. Stage Router may route the context to stages based on the execution plan and Step Router may route the context to steps based on the execution plan. Reference Data may refer to reference data lookup. Other concepts and interfaces may be implemented. An embodiment of the present invention is directed to a cumulative data model implemented by a Stage Router and multiple Stages and Topologies. The system provides a layered planning process across multiple services.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 3:
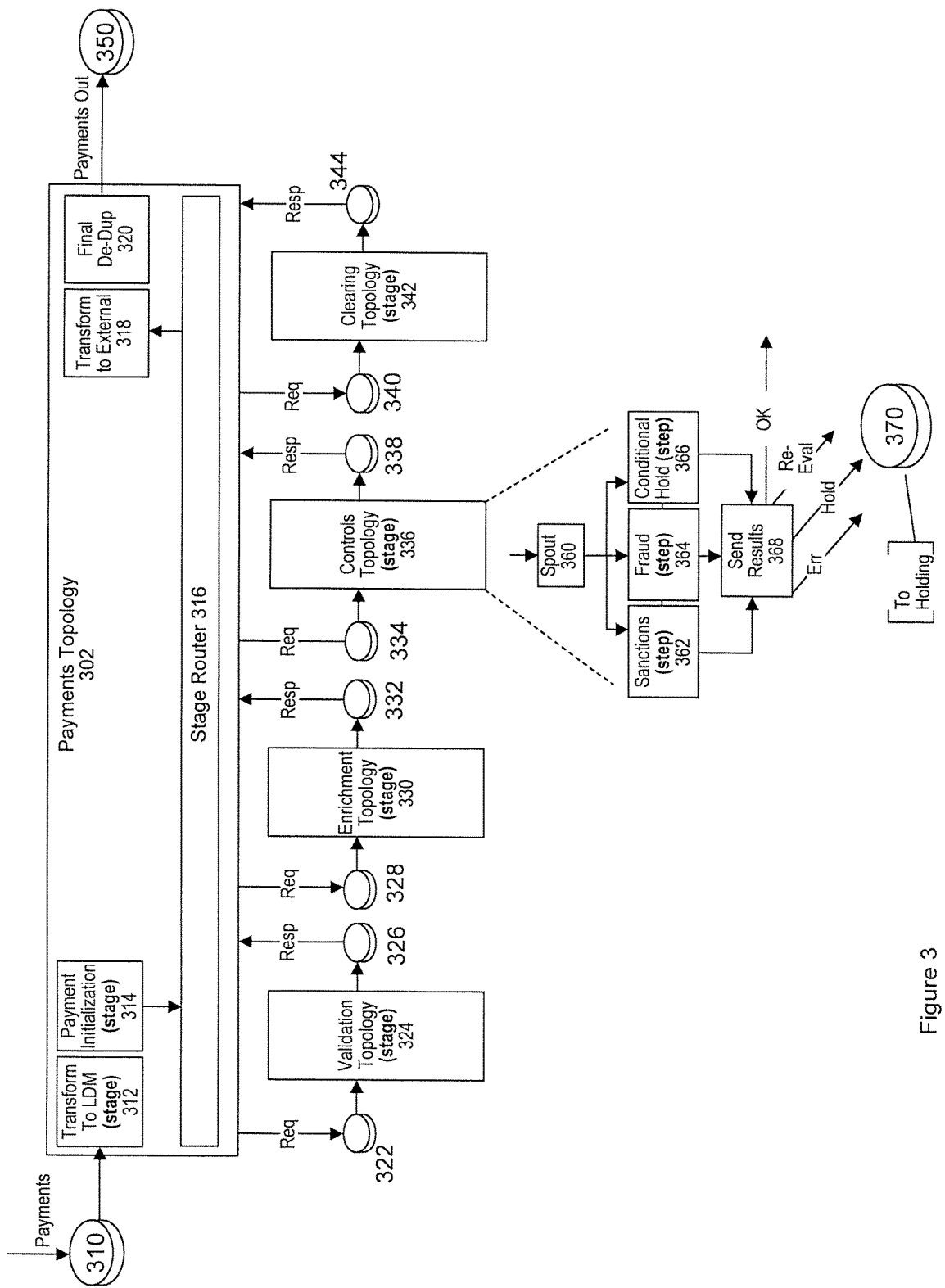
FIG. 3 illustrates a schematic diagram of a payment engine system, according to an exemplary embodiment.

FIG. 3 illustrates a schematic diagram of a payment engine system 100, according to an exemplary embodiment. FIG. 3 illustrates a payment engine end-to-end implementation. An embodiment of the present invention may include multiple topologies, including Payments, Validation; Enrichment; Controls and Clearing. For example, Payments may contain transformation, initialization, final deduplication and any common routing/re-planning stages.

As shown in FIG. 3, Payments may be received at Router 310 and entered into multiple stages, including Transform to LDM 312 and Payment Initialization 314. Payments Topology 302 may include a Stage Router 316. In the exemplary illustration of FIG. 3, multiple stages may include a Validation Topology 324; Enrichment Topology 330; Controls Topology 336 and Clearing Topology 342. Stage Router 316 may further communicate with a Transform to External function 318 and a Final De-Dup Stage 320 until payments are transferred out to Router 350.

As illustrated in FIG. 3, Controls Topology 336 may include multiple stages including Spout 360, Sanctions Step 362, Fraud Step 364 and Conditional Hold Step 366. The results may be received and then transmitted, as shown by Send Results 368. The output of which may then be sent to Router 370.

According to the various embodiments of the present invention, additional functionality of the payment engine may include logical data model generation, encryption, transport format, compression, input transformation, initialization, stage routing, hard, shadow and insertion stages, payment prioritization, payment resubmission and error handling, transactions and final duplicate detection.

Regarding logical data model generation, payment engine may utilize a Core Information Architecture (IA) defined LDM. Code generation may produce data objects (e.g., Java POJOs) to be used within the payment engine. Also, code generation may be integrated within a build process with continued tight collaboration with Core IA.

According to an embodiment of the present invention, encryption may be employed in transit and at rest within a database and a message broker to assess the impact of such measures and build a realistic performance profile. For example, symmetric encryption (AES-128) may be utilized. Other encryptions may be applied as well.

According to an embodiment of the present invention, payments may be transported and stored in a serialized form of the LDM defined and generated by Core IA. An exemplary serialization format may produce extremely fast and small serializations. For example, persistence of the payment may be as an AES-128 encrypted serialized byte stream.

According to an embodiment of the present invention, compression may be implemented to reduce the size of IO writes as a cost of CPU.

According to an exemplary input transformation, for an initial flow (e.g., TSSFX), transformation from Swift MT202 to a LDM Payment Instruction may be implemented as a 2 stage transformation. SWIFT MT202 may be converted to a Java MT202 utilizing Prowide Core, and then further mapped to Java LDM utilizing Dozer. The Java MT202 to LDM mapping may be defined within an XML configuration.

Figure 4:
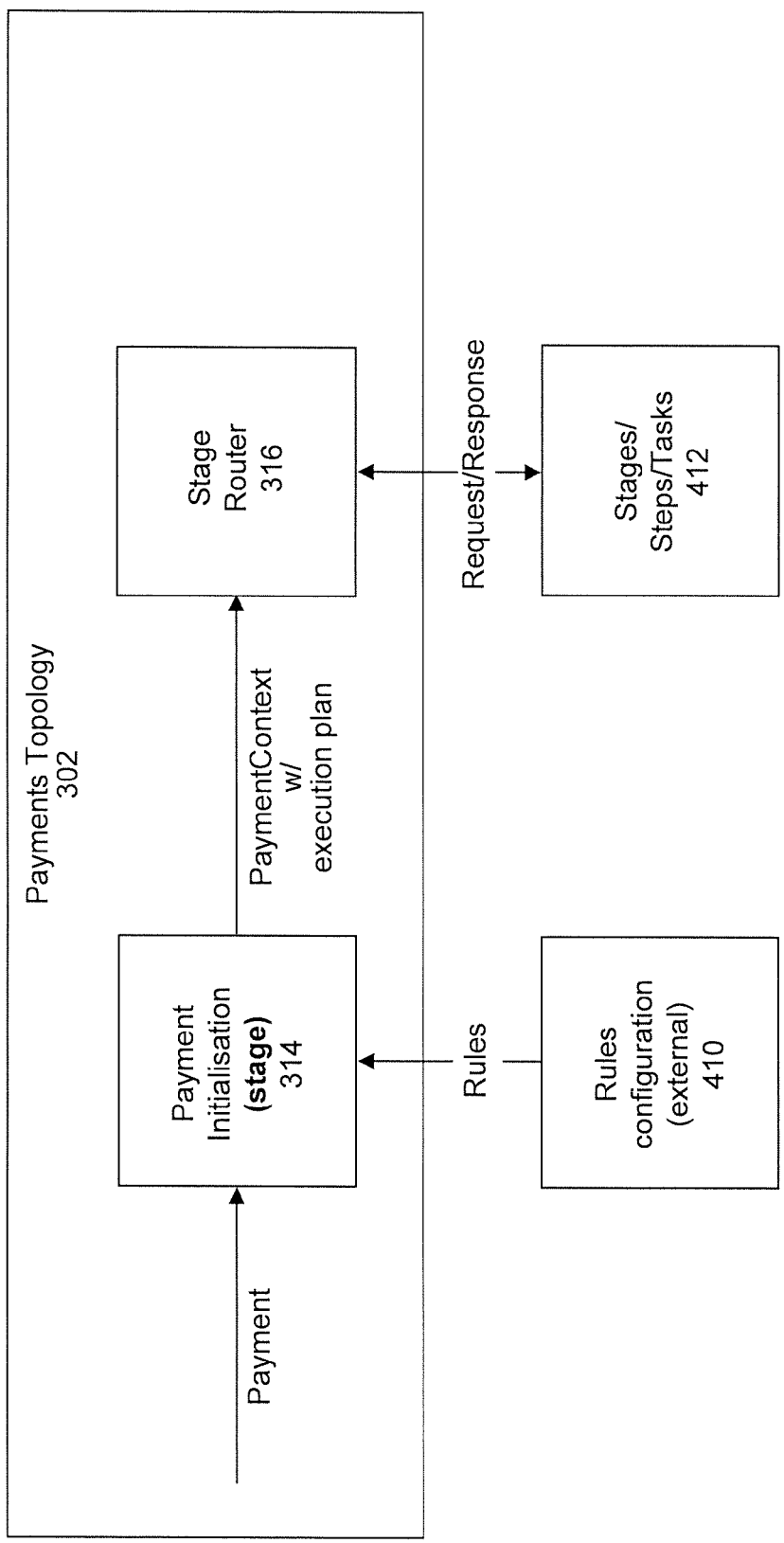
FIG. 4 is an exemplary illustration of a payment initialization process, according to an embodiment of the present invention.

FIG. 4 is an exemplary illustration of a payment initialization process, according to an embodiment of the present invention. As shown in FIG. 4, payment initialization may involve creating an execution plan for the payment (e.g., stages, steps, tasks relevant to the payment) and an initial Payment Context containing the payment and routing information. Where stages, steps and/or tasks may be selected by interrogating the incoming payment LDM, these may be typically selected at the initialization stage.

As shown in FIG. 4, a payment may be received at a Payment Initialization Stage 314. Rules configuration data may be received from 410. This data may be from an external source. Payment Initialization 314 may then generate a payment context with an execution plan. This may be received at Stage Router 316. Payment context may then be routed to appropriate stages, steps and tasks utilizing the execution plan. The output may specify the stages, steps and/or tasks relevant to the payment, as shown by 412.

An embodiment of the present invention may implement a rules engine to interpret business rules in relation to the LDM. Also, initialization may be called at other locations within the payment processing flow (e.g., stage router), in the instance where "re-planning" may be implemented.

Stage Router 316 may examine the execution plan, determine the next stage and route to the next or final stage, while auditing a full Payment Context plan at each stage.

An embodiment of the present invention may implement stages, such as hard, shadow and insertion stages. For example, insertion of stages may be implemented to meet a number of requirements related to testing, prototyping and/or replacing an existing stage.

Hard stage may be wired directly into the main payment flow statically. Hard stage may be used where payments would likely be routed to the stage, and suggests a permanent lifetime, and owns private request/response topic. Default behavior may route to hard stages but configuration within the execution plan allows the selection of an alternate stage type.

Shadow Stage may "shadow" an existing stage, but to where only certain payment types should be routed. For example, Shadow Stage may be used for testing or deploying a significantly different regional stage where it owns a request topic but uses shadowed stage response topic.

Figure 5:
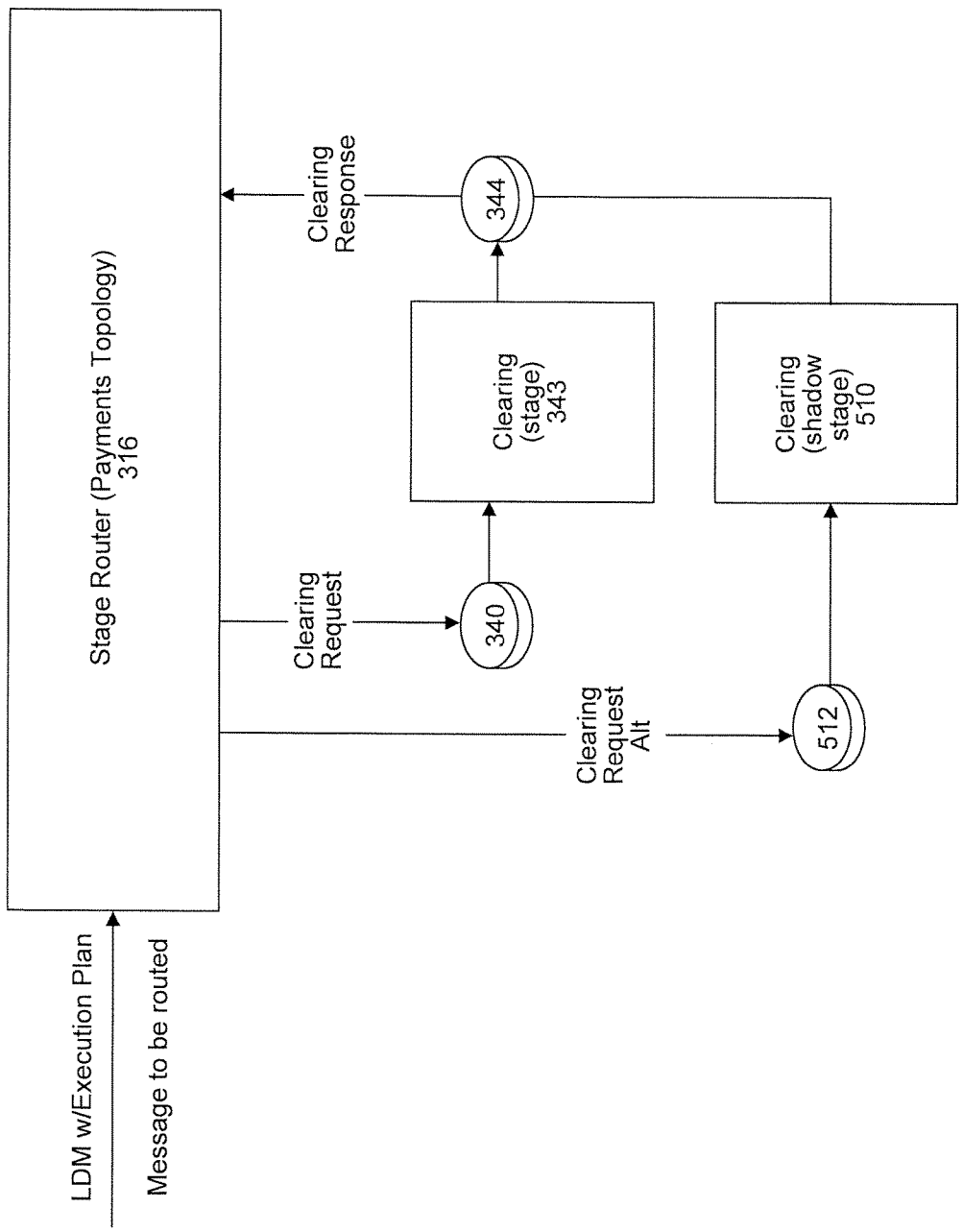
FIG. 5 is an exemplary illustration of a shadow stage, according to an embodiment of the present invention.

FIG. 5 is an exemplary illustration of a shadow stage, according to an embodiment of the present invention. As shown in FIG. 5, a LDM with an execution plan may be routed to Stage Router 316. An alternate request topic may be configured via the execution plan and routed to a Clearing Stage 510, via Router 512. A clearing request may be routed to Clearing Stage 342, via Router 340. A clearing response may be generated and sent to Stage Router 316, via Router 344. For example, the response via the clearing response topic may be generated. As far as the router is concerned, the response is from controls.

Insertion Stage may be directly inserted between two existing hard stages. Insertion stage may be used where certain payments require an additional full stage. For example, Insertion stages may be considered lighter and/or temporary precursors to a hard stage (e.g., as the stage router may skip unrequired stages for a given payment). In this example, Insertion Stage may own a request topic but use a global response topic.

Figure 6:
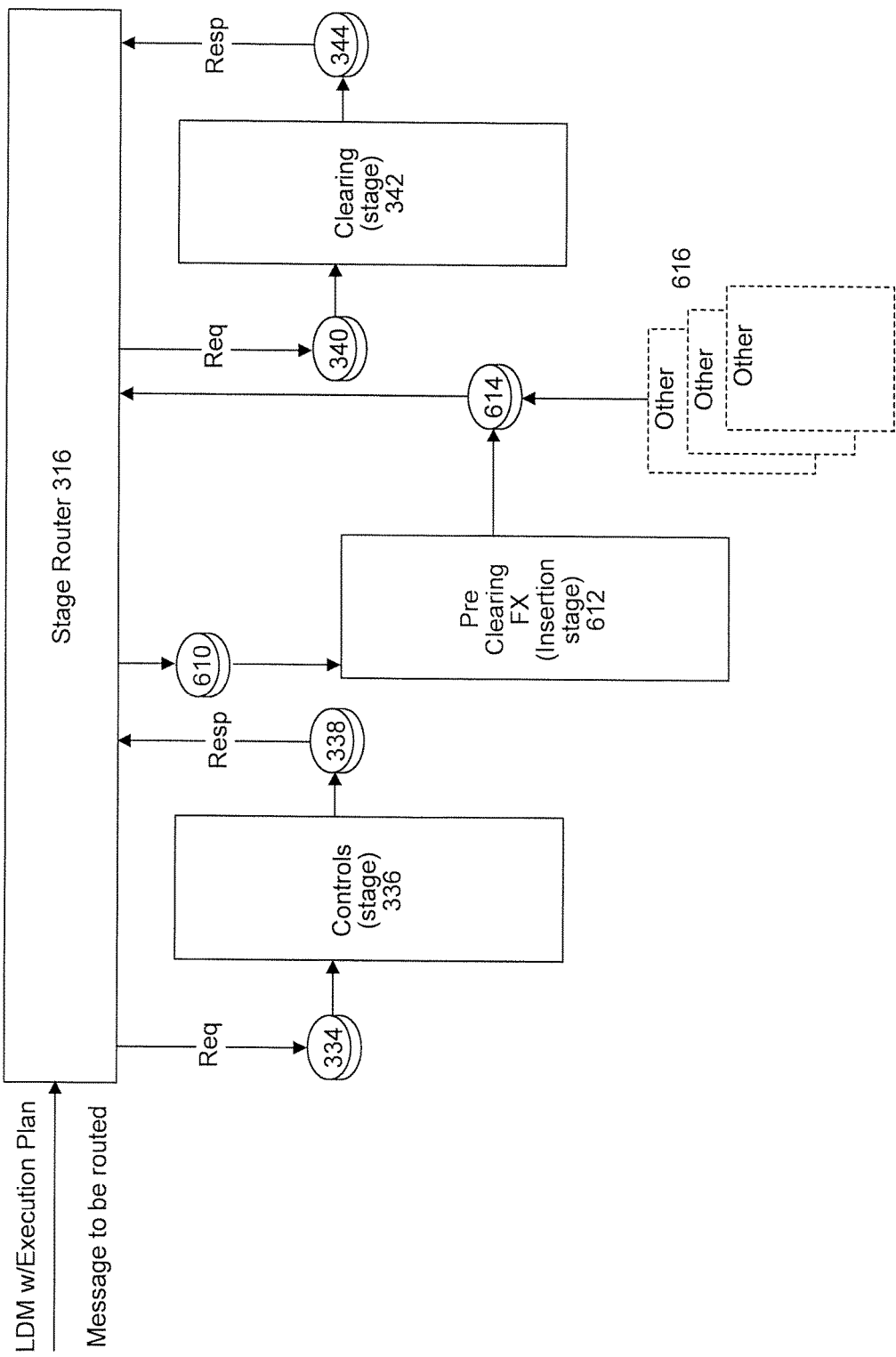
FIG. 6 is an exemplary illustration of an insertion stage, according to an embodiment of the present invention.

FIG. 6 is an exemplary illustration of an insertion stage, according to an embodiment of the present invention. As shown in FIG. 6, a LDM with an execution plan may be routed to Stage Router 316. A request may be sent to a router 334 to Controls Stage 336 to generate a response back to Stage Router 316, via Router 338. An alternate request topic may be configured via the execution plan and routed to a Pre-Clearing FX (Insertion Stage) 612, via Router 610. A response via global stage topic may be generated and shared by other insertion stages, represented by 616. The response may be sent to Stage Router 316, via Router 614. Another request may be sent to a Router 340 to Controls Stage 342 to generate a response back to Stage Router 316, via Router 344.

Figure 7:
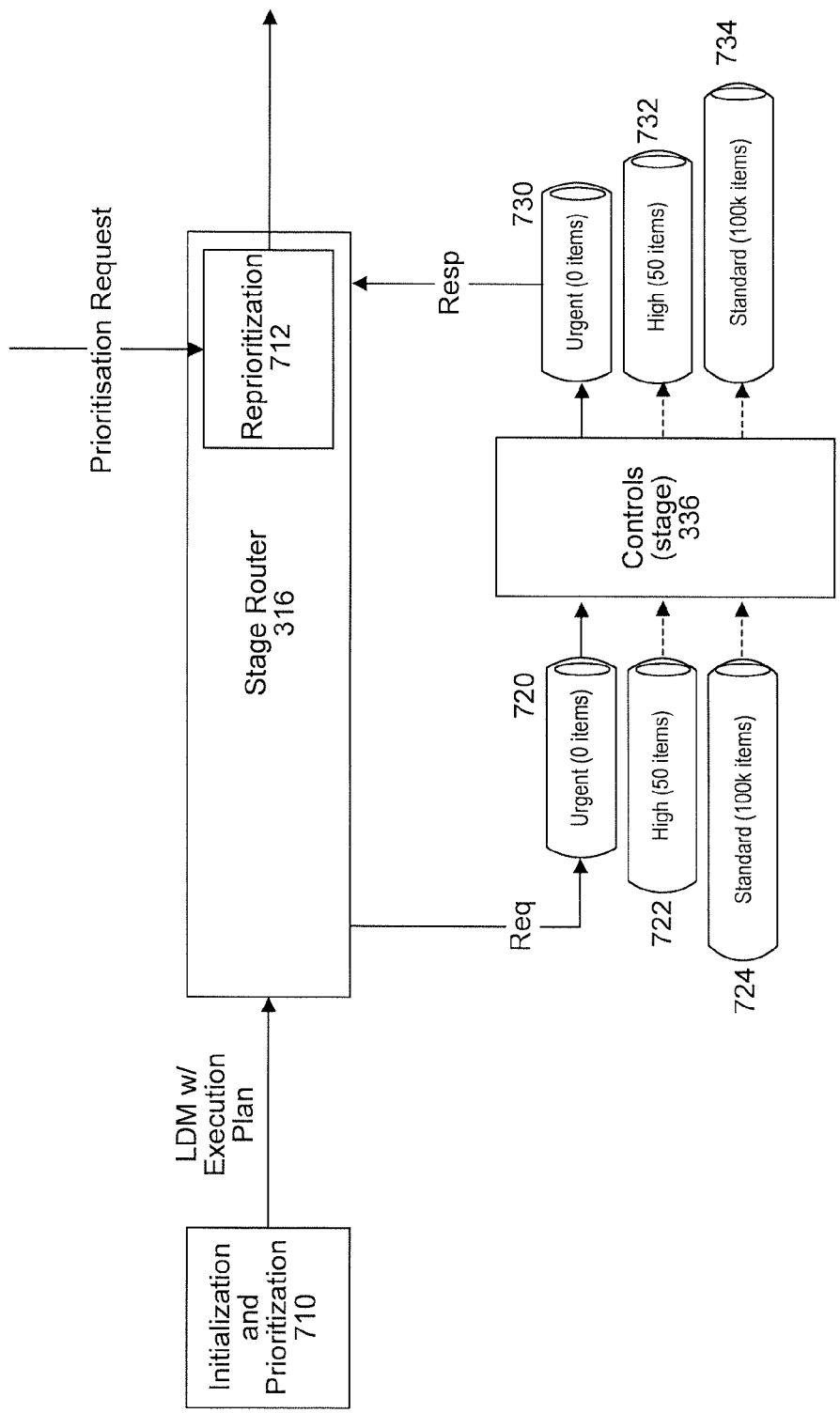
FIG. 7 is an exemplary system implementing payment prioritization, according to an embodiment of the present invention.

FIG. 7 is an exemplary system implementing payment prioritization, according to an embodiment of the present invention. Payment prioritization of certain payments may be required at initialization and during payment processing due to operator intervention, for example. Also, classes of priority (e.g., client, product, etc.) may be fed into an overall priority used within the payment engine for routing purposes. Typically, on an unloaded system, a payment may take approximately 100 ms to process (excluding external factors). However, on a heavily loaded system, the time may increase to 1 minute or more. Usually, this time is not actually within the payment engine itself, but mostly due to queue backlogs which can take time to clear and follow strict FIFO semantics. Moreover, it may not be possible to selectively read those higher priority messages from the topic and/or queue, unless the underlying broker supports message prioritization and/or selectors.

The payment engine of an embodiment of the present invention provides a simple and effective method of prioritization which maintains sub-second processing times for high priority payments even with huge queue and/or topic backlogs. Each topic may include three variants, e.g., a standard, high and urgent. Additional and/or other variants may be implemented.

As shown in FIG. 7, a LDM with execution plan may be communicated from Initialization and Prioritization 710 to Stage Router 316. The request may be sent to Controls Stage 336. As shown in FIG. 7, high priority payments may skip the queue and be processed first. The exemplary illustration of FIG. 7 shows three queues at the input to Control Stage 336 and three queues at the output. Another number of queues may be implemented at the input and output to Control Stage. In the example of FIG. 7, the three exemplary queues for prioritized requests include Urgent 720, High 722 and Standard 724. As the payment is initialized, it may be assigned an overall priority, e.g., from 0 to 9 dependent on the various priority types. Dependent on the priority assigned, the payment may be routed to either standard, high or urgent topics, on the assumption that high and urgent topics are significantly less congested than standard topics. This effectively allows priority payments to jump the queue, and be processed end to end quickly. After processing, the response may be transmitted back to Stage Router 316. In this exemplary illustration, there are three queues—Urgent 730, High 732 and Standard 734. As shown in this example, Urgent 730 queue has a processing time of 100 ms; High 732 may have a longer processing time of 1 s and Standard 734 has an even longer processing time of 60 s. Other variations may be implemented.

According to a prioritization function of an embodiment of the present invention, priority payments may be identified upfront (e.g., client priority). However, in some cases, priority of a payment may be changed "in flight." For example, a REST API may change the priority of a specific payment, at a stage router. Once applied, an appropriate topic selection may take place. Further prioritizations may be performed at other levels or stages, e.g., at the task level should the business/service requirement define. As shown in FIG. 7, responsive to a prioritization request to Reprioritization 712, the payment may be sent to a next stage with a modified priority.

Figure 8:
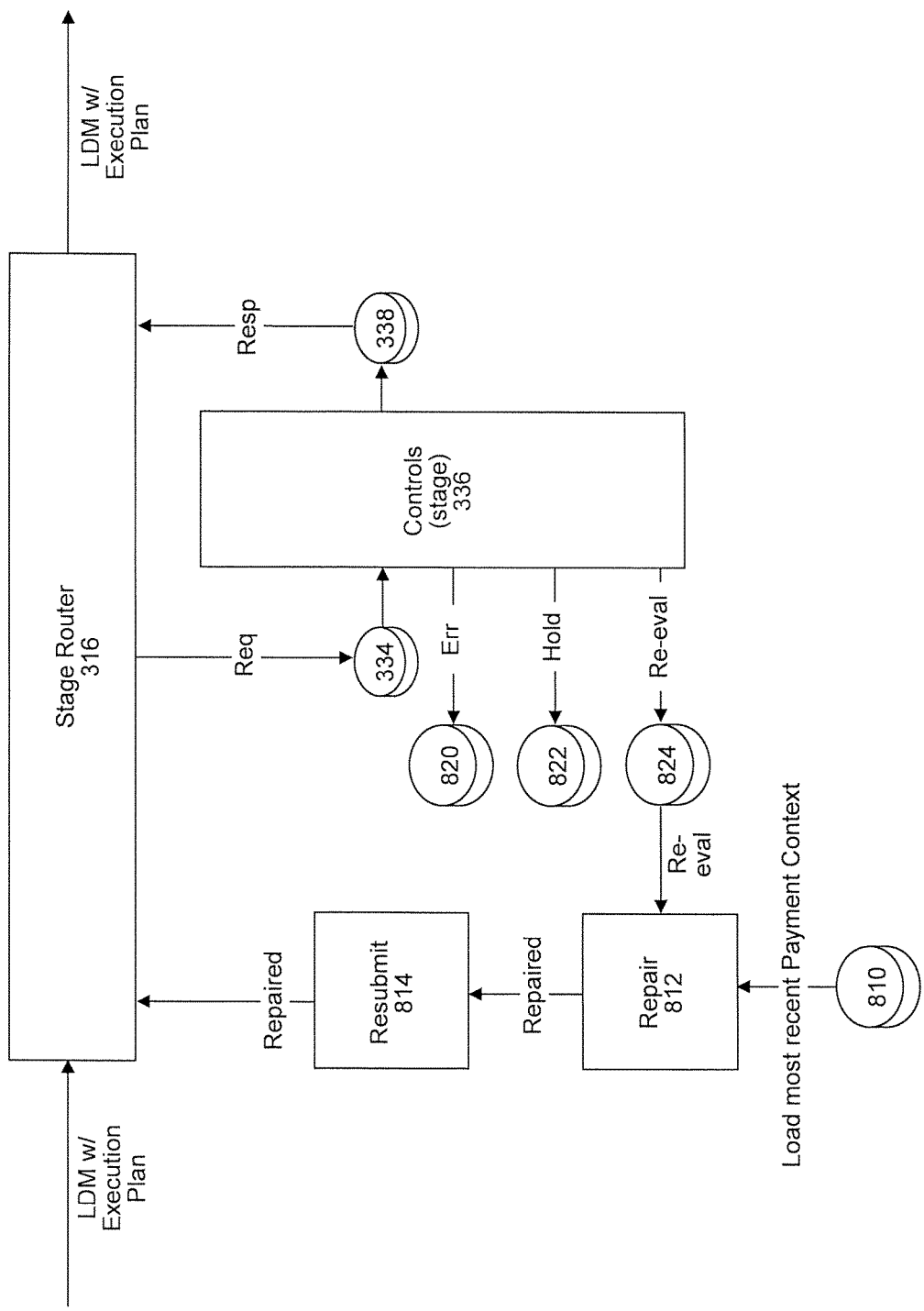
FIG. 8 is an exemplary illustration of Payment Resubmission/Error Handling, according to an embodiment of the present invention.

FIG. 8 is an exemplary illustration of Payment Resubmission and/or Error Handling, according to an embodiment of the present invention. During payment processing, a number of exception scenarios may occur which require operator intervention and/or other action. For example, in some exception scenarios, a payment may be held and later resubmitted for continued processing. Also, return statuses may be provided by tasks, including OK, WAITING, HOLD, RE-EVAL and ERROR. Other statuses and variations may be implemented. At the end of a stage, these statuses may be aggregated and an overall status may be created. The status may be used to continue processing the payment or place the payment within a holding queue.

During processing of a stage, the payment engine may execute steps and tasks and return final or intermediate results. An aggregator may collect results for the steps, and build up an overall status once the tasks have returned results. Once an overall result has been built up, the payment may be sent back to the stage router for continued processing, or pushed to a holding queue for operator intervention.

As shown in FIG. 8, a most recent Payment Context may be loaded to Repair 812, from Router 810. A most recent payment context submitted to failed stage may be loaded for repair using audit information and resubmitted. When repaired, the payment context may be resubmitted and transmitted, via Resubmit 814 to Stage Router 316. Failed payments may be held in an appropriate holding queue. As shown in FIG. 8, failed payments may include errors, received at 820 and payments on hold at 822. Payments for re-evaluation may be received at 824, and re-evaluated via Repair 812. For example, once a payment is held within a holding queue (e.g., RE-EVAL, ERROR or HOLDING), the payment may be retrieved and repaired via operator tools. The payment may then be re-submitted back to the stage router 316, execution plan re-evaluated and payment re-routed.

An embodiment of the present invention is directed to processing data at least once and integrating with transactional messaging middleware. The message may be destructively read (or offset advanced) once downstream bolts have acknowledged successful processing. Where processing fails (or process outage occurs), the message may be replayed from the beginning of the current stage. This single resource transaction may simplify management with predictable behaviour on failure. However, the payment engine may require the use of multiple transactional resources in order to process a payment and therefore some form of synchronization may be implemented.

For example, the Step may be a transactional unit of work within the payment engine. For a given payment, multiple steps may be executed in parallel as distinct "sub transactions." Therefore, during failure, some steps may be complete and others not and during replay, there may be an inconsistent state for the stage. Accordingly, steps need to be aware of the current state on a replay in order to take the appropriate action based on configuration.

For (Transactions) Transactional, tasks within the step may be treated as a single transaction and committed together at Step finish. For (Transactions) Non transactional, tasks within the step either a) are stateless or b) have no real dependency on being committed at Step end. In this case, any audits generated may be batched and saved at aggregation. Reduced number of network trips leads to better performance, typically used for validation type tasks.

For (Replay-ability) Replay-able, step may be completely replay-able even if previously completed and audited. For (Replay-ability) Non replay-able, step should never be replayed if previously completed for a given payment.

An embodiment of the present invention is directed to a Final Duplicate Detection (e.g., In Doubt Payments). This feature is directed to ensuring that a given payment does not leave the Payment Engine more than once. One way to implement this feature may involve using full 2 phase commit transactions (e.g., extended architecture (XA), etc.), which would incur a significant performance penalty and mandate all transactional resources would need to support such a protocol. A common compromise may involve utilizing nested (e.g., composite) transactions which never lose data but failure conditions may occur and compensatory action should be taken.

Duplicates can arise from many sources, including external and internal sources. (Case 1) External sources may involve an upstream system sending a duplicate due to a failure condition. (Case 2) Internal (upstream) may include an upstream stage sending duplicate due to a failure condition (rare). (Case 3) Internal may include a scenario where a component re-receives partially processed message on recovery due to replay mechanisms.

Cases 1 and 2 may be addressed by ensuring stages/ services are idempotent (denoting an element of a set that is unchanged in value when multiplied or otherwise operated on by itself) and implementing standard duplicate detection patterns/replay strategies where required. Case 3 may also be handled in the same manner however on the outbound flow the system may be required to ensure the message is never resent as there is a small window where a payment has been produced but not acknowledged to the source spout. To address this duplicate scenario, the system may utilize a duplicate detection logic. An embodiment of the present invention may identify payments which have been attempted to send but not necessarily completed. The exemplary approach taken may involve a process involving: (step 1) Flagging payment as 'ready to send' (if not existing in this state—or fail); (step 2) Producing payment; (step 3) Flagging payment as 'processed' (alternate thread examining topic, or same thread—less reliable) and (step 4) Acknowledging payment.

With the above, a gap may still exist between steps 1-3, where a payment has not been sent but the "processed" update did not succeed. On replay, step 1 may detect the presence of this attempt and prevent the message send. This may be referred to as an "in doubt" payment and referred to an operator for intervention. Any duplicates with a status of "processed" may be silently filtered as the failure occurred steps between 3-4.

Figure 9:
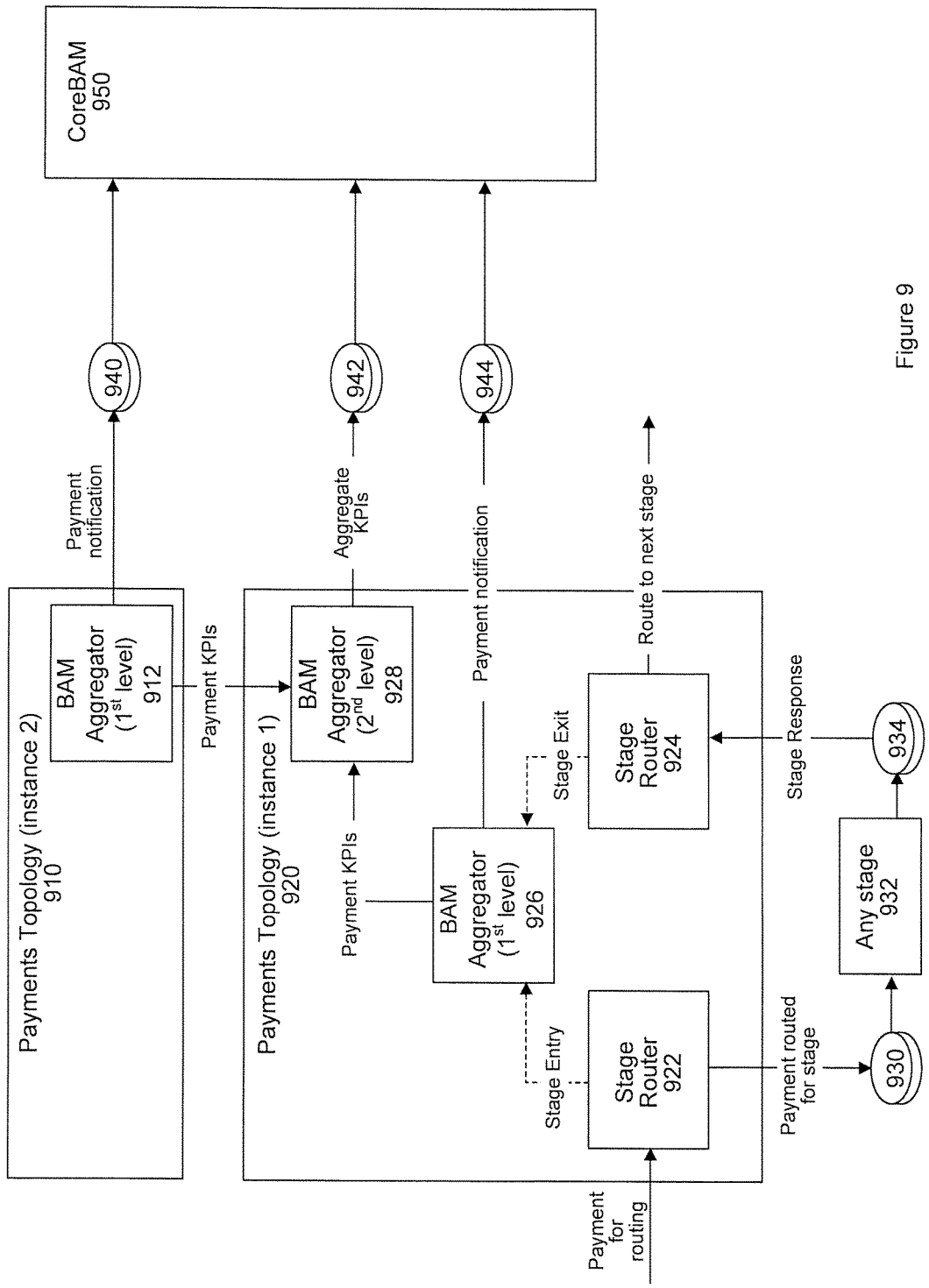
FIG. 9 is an exemplary illustration a business activity monitoring integration, according to an embodiment of the present invention.

FIG. 9 is an exemplary illustration of a business activity monitoring integration, according to an embodiment of the present invention. As shown in FIG. 9, a payment engine may be integrated with Business Activity Monitoring ("BAM") from an incubation stage. Statistics may be aggregated from key checkpoints within the system and sent to CoreBAM periodically in the Core IA a proprietary summary format as a set of key performance indicators (KPIs). CoreBAM may refer to a line of business' central business activity monitoring application. Furthermore, individual payment events may be sent as proprietary entity notifications to allow finer grained rules processing on individual payments as opposed to aggregations. According to an exemplary illustration, BAM events and data may be sent to bam_payments/bam_summary topics and consumed by CoreBAM and eventually persisted within a CoreBAM Cassandra DB store. This data may then be made available for the BAM UI and further aggregations and/or rule processing.

As shown in FIG. 9, Topologies may be spread across many workers where aggregation status may be represented at a system level. Payment Topology 920 represents Instance 1 and Payment Topology 910 represents Instance 2. Topology 910 may include Aggregator ($1^{st}$ level) 912 that transmits payment notification to CoreBAM 950, via Router 940. Payments Topology 920 may include Stage Routers 922, 924 and Aggregators 926, 928. A payment for routing may be received at Stage Router 922, which then routes the payment to a Stage 932, via Router 930. A response may be routed to Stage Router 924, via Router 934. Stage Router 924 may route the payment to a next stage. Aggregator ($1^{st}$ level) 925 may receive stage entry and stage exit. Payment notification may be transmitted to CoreBAM 950, via Router 944. Payment KPIs may be sent to Aggregator ($2^{nd}$ level) 928, where KPIs are aggregated and then transmitted to CoreBAM 950, via Router 942. An embodiment of the present invention provides transparent routing to aggregation tasks.

The stage router is a key intersection point at which events may be sent to CoreBAM. Events may be sent in an unanchored manner, such that any failure in the CoreBAM interface may not affect payment processing flow. Other integrations may be implemented, including integration with the Payments ODS, Spring Framework, Websphere MQ, Quartz, for example.

According to an exemplary embodiment, the system may integrate an operations dashboard to transform human interaction of payment processing into efficient seamless workflows with all aspects of the process captured in a single highly configurable highly entitlement-driven UI. For example, the operations dashboard may bring to one place the interactions of payment-flow configurations, payment-interventions, inquires, payment reporting, business monitoring and workflow and work-queue management in a way where regional teams can easily transition between global payment flows.

Figure 10:
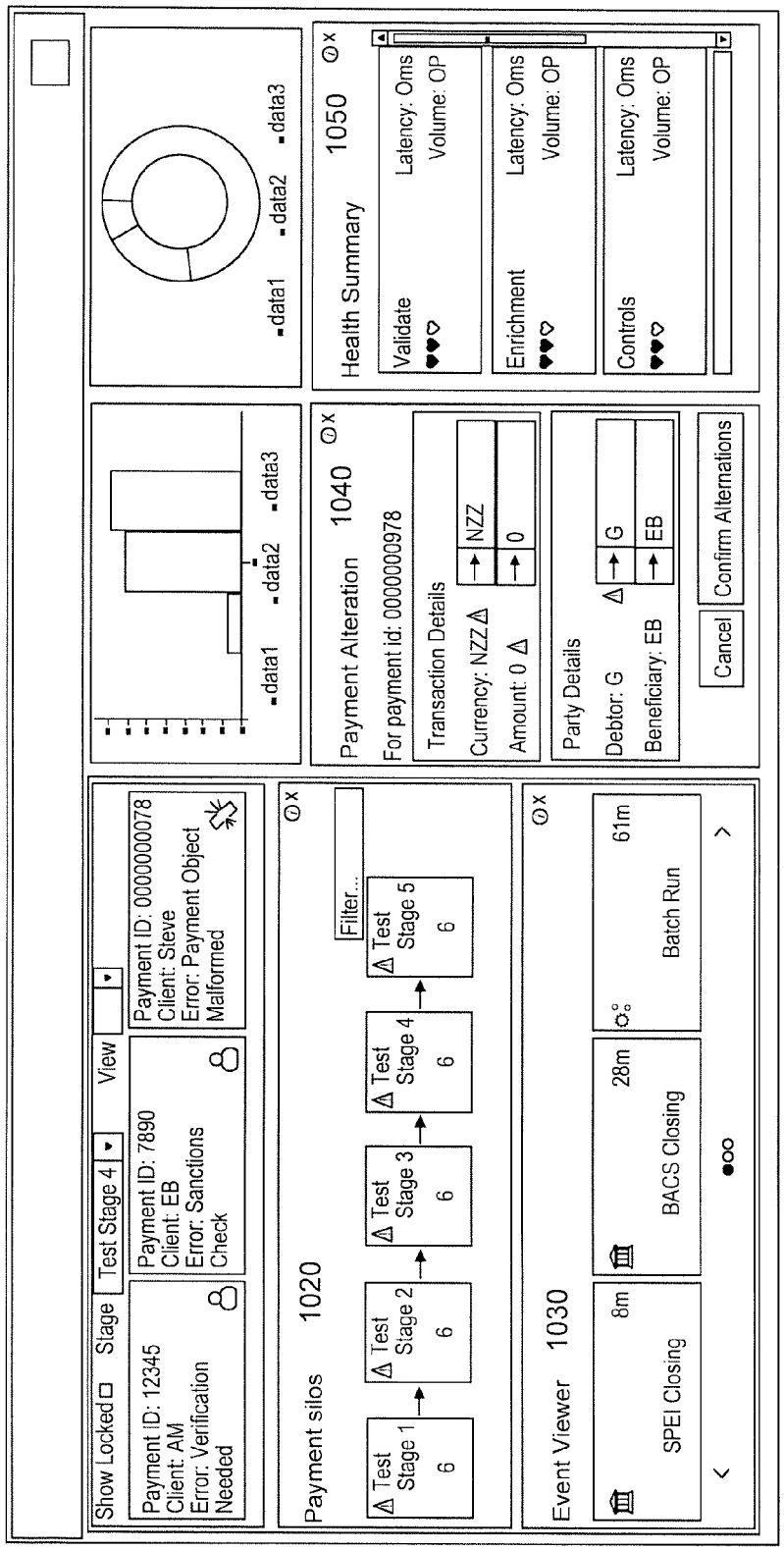
FIG. 10 is an exemplary dashboard, according to an embodiment of the present invention.

FIG. 10 is an exemplary dashboard, according to an embodiment of the present invention. FIG. 10 illustrates utilizing the payment engine re-eval, error, and holding exception queues, exceptions and statistics and displays and updates on the consolidated UI in real-time. As shown in FIG. 10, the exemplary dashboard may include Payment Silos 1020, Event Viewer 1030, Payment Alteration 1040 and Health Summary 1050. Other data and variations in interfaces may be implemented.

Figure 11:
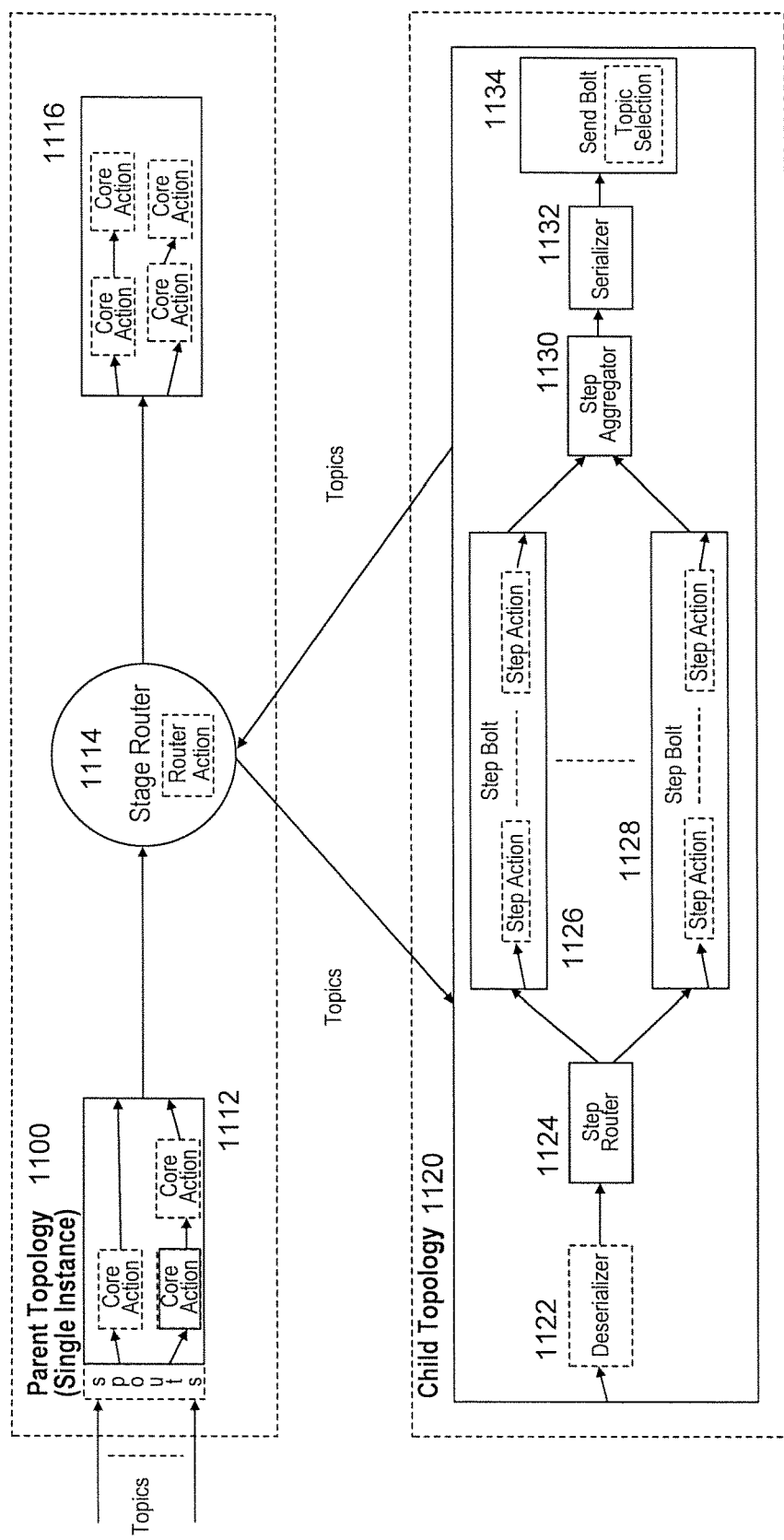
FIG. 11 is an exemplary illustration of a payments engine framework, according to an embodiment of the present invention.

FIG. 11 is an exemplary illustration of a payments engine framework, according to an embodiment of the present invention. As shown in FIG. 11, Parent Topology 1100 may include Core Actions 1112, 1116 in communication with a Stage Router 1114. Stage Router 1114 may also communicate topics to Child Topology 1120. In this example, Child Topology 1120 may include a Deserializer 1122, Step Router 1124, a plurality of Step Actions represented by 1126, 1128, Step Aggregator 1130, Serializer 1132, Topic Selection (top selection) 1134.

Figure 12:
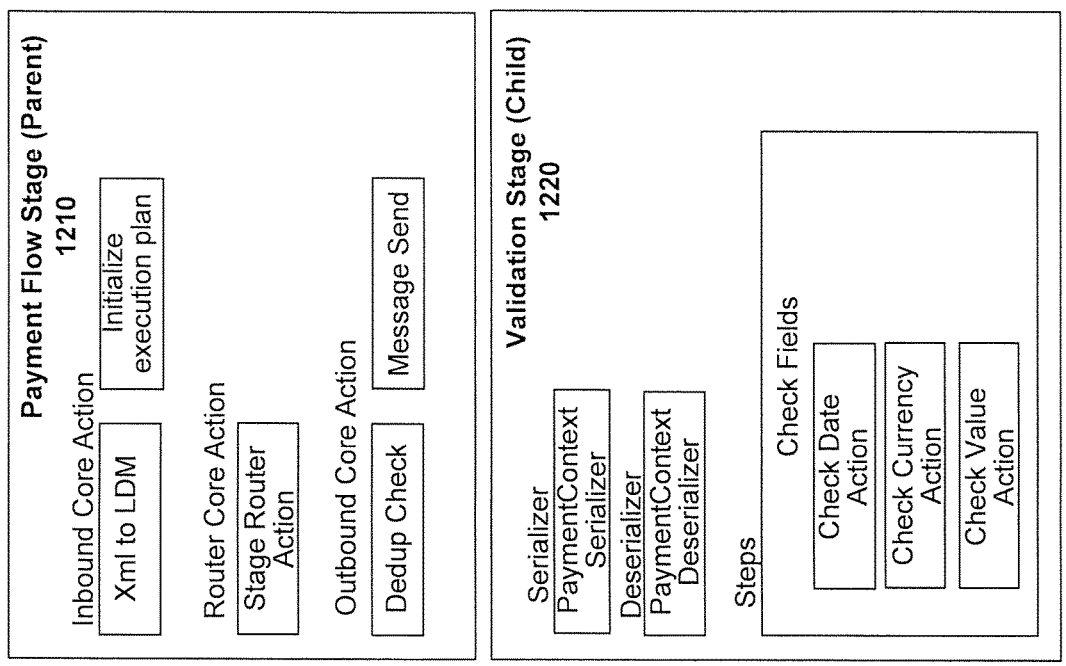
FIG. 12 is an exemplary payment flow stage and validation stage, according to an embodiment of the present invention.

FIG. 12 is an exemplary payment flow stage and validation stage, according to an embodiment of the present invention. Payment Flow Stage 1210 may include an Inbound Core Action (e.g., handles tasks performed before a payment is sent to a child stage), Router Core Action (e.g., handles the transmission to and response from child stages) and Outbound Core Action (e.g., handles the tasks performed after a payment is received from child stages). Validation Stage 1220 may include Serializer, Deserializer and Steps. Other variations may be implemented.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the Figures include a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The components illustrated in the Figures above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the various devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A global payment engine comprising:
 a payment initialization input that receives an electronic payment; the payment initialization input generates a payment context with an execution plan;
 a payments topology comprising a stage router, coupled to the payment initialization input and further in communication with a transform-to-external component and de-duplication component; and
 the stage router routes the payment context in accordance with the execution plan to a plurality of stages, the plurality of stages comprising a validation stage, an enrichment stage, a controls stage and a clearing stage where after each stage, the payment context is routed back to the stage router before being routed to a subsequent stage
 the transform-to-external and de-duplication components transferring a fully routed payment out of the global payment engine, thereby finalizing processing of the electronic payment.

2. The global payment engine of claim 1, wherein the stage router reprioritizes the payment context responsive to a prioritization request, the stage route routes the payment context with a modified priority.

3. The system of claim 1, wherein the payment initialization input further receives one or more rules.

4. The system of claim 1, further comprising a clearing shadow stage that receives an alternate request topic.

5. The system of claim 1, further comprising a pre-clearing stage that receives an alternate request topic via an execution plan and generates a response shared by one or more other insertion stages.

6. The system of claim 1, wherein one or more high priority payments are processed ahead of other payments.

7. The system of claim 1, wherein the stage router loads most recent payment context submitted to failed stage.

8. The system of claim 7, wherein the most recent payment context is repaired and resubmitted to the stage router.

9. The system of claim 7, wherein one or more failed payments are held in one of the following queues: error, hold and re-evaluate.

10. The system of claim 1, wherein the stage router audits the payment context at each stage.

11. A method comprising the steps of:
receiving, via a payment initialization input, an electronic payment; the payment initialization input generates a payment context with an execution plan;
implementing a payments topology comprising a stage router, coupled to the payment initialization input and further in communication with a transform-to-external component and de-duplication component; and
routing, via the stage router, the payment context in accordance with the execution plan to a plurality of stages, the plurality of stages comprising a validation stage, an enrichment stage, a controls stage and a clearing stage where after each stage, the payment context is routed back to the stage router before being routed to a subsequent stage
transferring, via the transform-to-external and de-duplication components, a fully routed payment out of the global payment engine, thereby finalizing processing of the electronic payment.

12. The method of claim 11, wherein the stage router reprioritizes the payment context responsive to a prioritization request, the stage route routes the payment context with a modified priority.

13. The method of claim 11, wherein the payment initialization input further receives one or more rules.

14. The method of claim 11, further comprising the step of:
receiving, via a clearing shadow stage, an alternate request topic.

15. The method of claim 11, further comprising the step of:
receiving, via a pre-clearing stage, an alternate request topic via an execution plan and generates a response shared by one or more other insertion stages.

16. The method of claim 11, wherein one or more high priority payments are processed ahead of other payments.

17. The method of claim 11, wherein the stage router loads most recent payment context submitted to failed stage.

18. The method of claim 17, wherein the most recent payment context is repaired and resubmitted to the stage router.

19. The method of claim 17, wherein one or more failed payments are held in one of the following queues: error, hold and re-evaluate.

20. The method of claim 11, wherein the stage router audits the payment context at each stage.

* * * * *